(12) United States Patent
Takamuku et al.

(10) Patent No.: US 7,910,245 B2
(45) Date of Patent: *Mar. 22, 2011

(54) POSITIVE ACTIVE MATERIAL WITH A POLYETHER MODIFIED SILICONE OIL AND RECHARGEABLE LITHIUM BATTERY INCLUDING THE SAME

(75) Inventors: Akira Takamuku, Yokohama (JP);
Sung-Soo Kim, Yongin-si (KR)

(73) Assignee: Samsung SDI Co., Ltd., Suwon (KR)

( * ) Notice: Subject to any disclaimer, the term of this patent is extended or adjusted under 35 U.S.C. 154(b) by 1080 days.

This patent is subject to a terminal disclaimer.

(21) Appl. No.: 11/614,374

(22) Filed: Dec. 21, 2006

(65) Prior Publication Data

US 2007/0148543 A1    Jun. 28, 2007

(30) Foreign Application Priority Data

Dec. 22, 2005   (JP) .................................. 2005-368961
Dec. 21, 2006   (KR) ........................ 10-2006-0131843

(51) Int. Cl.
  *H01M 4/60*   (2006.01)
(52) U.S. Cl. ........................................ 429/212; 29/623.5
(58) Field of Classification Search .......... 429/122–347; 29/623.1–623.5
See application file for complete search history.

(56) References Cited

U.S. PATENT DOCUMENTS

| 5,478,672 | A  | * | 12/1995 | Mitate ............................ | 429/224 |
| 6,884,270 | B2 | * | 4/2005  | Yoshino et al. ............... | 29/623.5 |
| 2004/0197668 | A1 | * | 10/2004 | Jung et al. ..................... | 429/330 |
| 2006/0008706 | A1 | * | 1/2006  | Yamaguchi et al. ........... | 429/313 |
| 2007/0178375 | A1 | * | 8/2007  | Kobayashi et al. ............ | 429/144 |

FOREIGN PATENT DOCUMENTS

| JP | 11273732      |   | 10/1999 |
| JP | 2005-071772   |   | 3/2005  |
| JP | 2006066095 A  | * | 3/2006  |
| KR | 1020040065152 |   | 7/2004  |
| KR | 1020050052217 |   | 6/2005  |

OTHER PUBLICATIONS

Machine Translation of JP 2006-066095 to Kashida et al. originally published on Mar. 9, 2006.*

* cited by examiner

*Primary Examiner* — Basia Ridley
*Assistant Examiner* — Jonathan G Leong
(74) *Attorney, Agent, or Firm* — H.C. Park & Associates, PLC

(57) ABSTRACT

A positive active material for rechargeable lithium battery includes an active material that can reversibly intercalate and deintercalate lithium; and polyether modified silicone oil supported on the active material. The positive active material is not deteriorated during charge and discharge, and has high-capacity, an excellent cycle characteristic and good safety.

17 Claims, 1 Drawing Sheet

POSITIVE ACTIVE MATERIAL WITH A POLYETHER MODIFIED SILICONE OIL AND RECHARGEABLE LITHIUM BATTERY INCLUDING THE SAME

CROSS-REFERENCE TO RELATED APPLICATIONS

This application claims priority to and the benefit of Japanese Patent Application No. 2005-368961 filed with the Japan Patent Office on Dec. 22, 2005, and Korean Patent Application No. 10-2006-0131843 filed in the Korean Intellectual Property Office on Dec. 21, 2006, the entire contents of which are incorporated herein by reference.

BACKGROUND OF THE INVENTION (a) Field of the Invention

The present invention relates to a positive active material for a rechargeable lithium battery, a rechargeable lithium battery including the same, and a method for manufacturing a rechargeable lithium battery. More particularly, the present invention relates to, a rechargeable lithium battery having a high-capacity, and an excellent cycle characteristic.

(b) Description of the Related Art

Rechargeable lithium batteries have been widely used as a power source for electronic devices such as a cellular phone, a digital still camera, a digital video camera, and a laptop computer. The conventional rechargeable lithium battery includes a positive active material of $LiCoO_2$, a negative active material of graphite, and an electrolyte of a non-aqueous solution. Recently, the rechargeable lithium battery having a high capacity is required to provide power to the electronic devices. In order to satisfy the requirements, researches for the negative active materials having a main component of Si have been progressed. As the negative active material including Si as a main component has a 10 times charge and discharge capacity compared with that of the graphite, it is promising for the future candidate for the electrode material. However, the negative active material including Si forms an alloy with lithium at charging and undergoes volume expansion or electrolyte decomposition.

In order to solve the problem, the negative active material including a multi-phase alloy powder in which is composed of the main-component of Si but Si is removed on the surface has been developed (Japanese Patent laid-open No. 2005-071772). Thereby, the utilization of the negative active material including Si is almost realized. When Li is deintercalated from the positive active material due to the charge the conventional rechargeable lithium battery, the positive active material is become to electrochemically unstable and the metal thereof such as Co is eluted to be deteriorated. Thereby, the cycle characteristic and the safety are deteriorated upon charging the battery since the positive active material is deteriorated. Further, since the deterioration of the positive active material is more remarkable if it is higher capacity, it is hard to obtain a rechargeable lithium battery having both a high capacity and excellent cycle characteristic and safety.

SUMMARY OF THE INVENTION

One embodiment of the present invention provides a positive active material for a rechargeable lithium battery which is not deteriorated during charge and discharge, and has high-capacity, an excellent cycle characteristic and good safety. Another embodiment of the present invention provides a rechargeable lithium battery including the positive active material. Yet another embodiment of the present invention provides a method of manufacturing the rechargeable lithium battery.

According to an embodiment of the present invention, provided is a positive active material for rechargeable lithium battery that includes an active material that can reversibly intercalate and deintercalate lithium; and a polyether modified silicone oil supported on the active material.

The polyether modified silicone oil is selected from the group consisting of the compounds represented by the following Formulas 1 to 5 and combinations thereof.

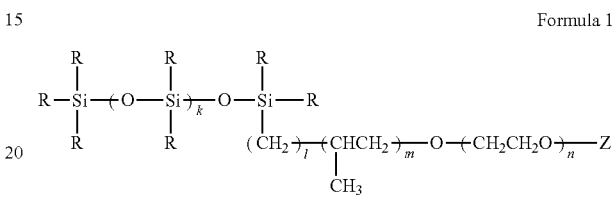

Formula 1

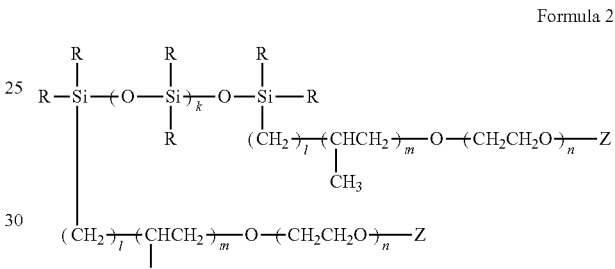

Formula 2

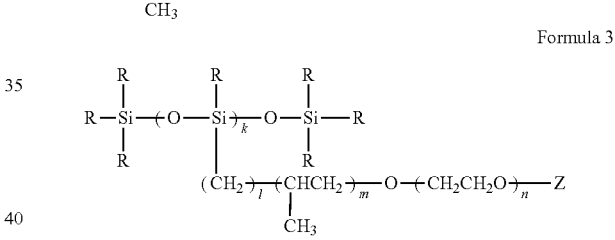

Formula 3

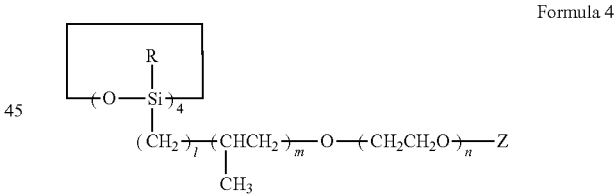

Formula 4

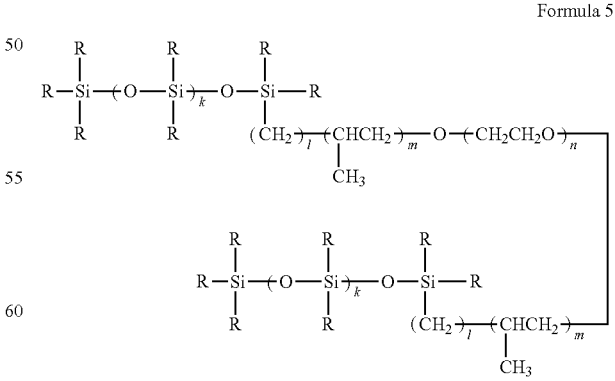

Formula 5

In the above Formulas 1 to 5, k ranges from 1 to 9, l ranges from 0 to 3, m ranges from 0 to 1, n ranges from 1 to 2, R is either of $CH_3$ or $C_6H_5$, and Z is either of $CH_3$ or $C_5$.

The polyether modified silicone oil may be present in an amount of 0.001 to 10 mass % based on the total mass of the positive active material.

The polyether modified silicone oil may be impregnated in the active material that can reversibly intercalate and deintercalate lithium.

Another embodiment of the present invention provides, a rechargeable lithium battery including a positive electrode comprising the above positive active material, a negative electrode, and an electrolyte.

The negative active material may include Si as a main component.

According to another embodiment of the present invention, provided is a method for manufacturing a rechargeable lithium battery that includes applying a positive electrode slurry including the positive active material onto a positive current collector to fabricate a positive electrode.

A rechargeable lithium battery may be fabricated as follows: a positive electrode slurry including a positive active material being capable reversible intercalation and deintercalation of lithium is applied onto a positive current collector to fabricate an positive electrode; and then the fabricated positive electrode is dipped in a solution including the polyether modified silicone oil selected from the group consisting of compounds represented by the above Formulas 1 to 5, and combinations thereof. Alternatively the fabricated positive electrode may be applied with the solution.

DETAILED DESCRIPTION OF THE EMBODIMENTS

Figure 1:
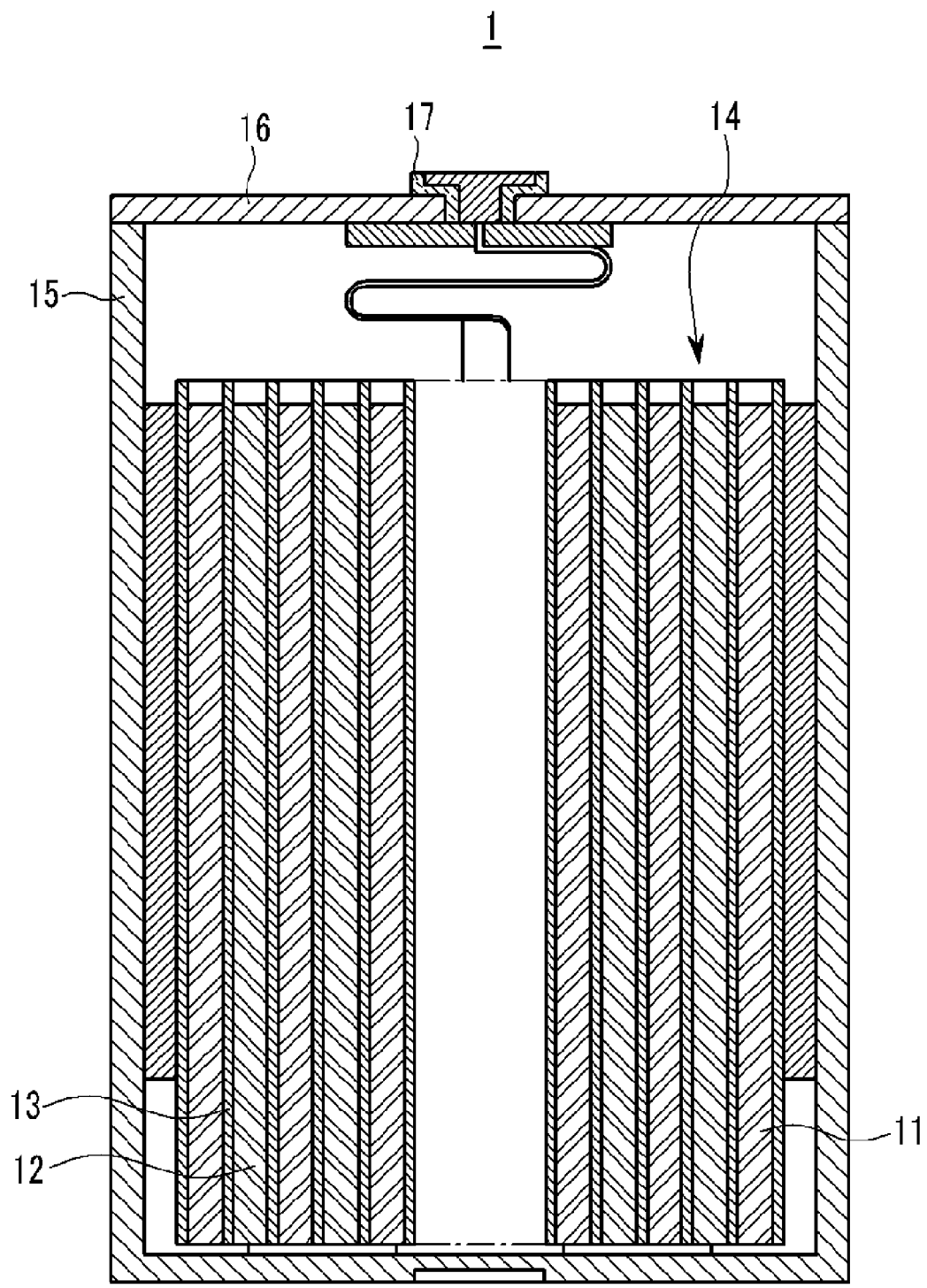
FIG. 1 is a schematic cross-sectional view of a rechargeable lithium battery according to one embodiment.

An exemplary embodiment of the present invention will hereinafter be described in detail with reference to the accompanying drawings.

The rechargeable lithium battery includes a positive electrode, a negative electrode, and an electrolyte.

Positive Electrode

The positive electrode includes a positive active mass including a positive active material, a conductive agent, and a binder; and a positive current collector on which the positive active mass is disposed. The positive active mass may be formed in a disk-shape to fabricate a pellet-shaped or sheet-shaped electrode.

The positive electrode includes a polyether modified silicone oil supported on a positive active material. The term "supported" refers to that the polyether modified silicone oil is immersed into the positive active material, or the surface of the positive active material is coated with the polyether modified silicone oil.

The positive active material may be a material that can reversibly intercalate and deintercalate lithium such as a Li-containing compound, oxide, sulfide, and so on. The positive active material may include at least one selected from the group consisting of Mn, Co, Ni, Fe, Al, and combinations thereof. Examples of the positive active material include $LiMn_2O_4$, $LiCoO_2$, $LiNiO_2$, $LiFeO_2$, $LiNi_{1/3}Co_{1/3}Mn_{1/3}O_2$, $LiNi_{0.8}Co_{0.2}O_2$, and so on. The bind polyvinylidene fluoride, polytetrafluoro ethylene, and so on. The conductive agent may include carbon such as carbon black, ketjen black, graphite, and so on. The positive current collector may include a metal foil or a metal net formed of aluminum, stainless steel, and so on.

The polyether modified silicone oil may be selected from the group consisting of the compounds represented by the following Formulas 1 to 5 and combinations thereof. As in the above Formulas 1 to 5, the modified polyether silicone oil includes one or two polyether chains (($-(CH_2)_1-(CH(CH_3)CH_2)_m-O-(C_2H_4O)_n-Z$) or ($-(CH_2)_1-(CH(CH_3)CH_2)_m-O-(C_2H_4O)_n-(CH_2CH(CH_3))_m-O-(CH_2)_1-$)) bound with a linear poly siloxane chain ($SiR_2-O-(SiR_2O-)_k-SiR_2$) or cyclic polysiloxane. The modified polyether silicone oil has high thermal stability due to a linear or cyclic poly siloxane chain.

In the above Formulas 1 to 5, k ranges from 1 to 9, l ranges from 0 to 3, m ranges from 0 to 1, n ranges from 1 to 2, R is either of $CH_3$ or $C_6H_5$, and Z is either of $CH_3$ or $C_2H_5$.

When K is more than 9, thermal stability can be improved, but viscosity increases and thereby lithium ions cannot be dissolved well resulting in deterioration of ion conductivity. When K is less than 1, the silicone oil can be decomposed easily.

When l is more than 3, the electrolyte viscosity increases and ion conductivity may be deteriorated.

When m is more than 1, the polyether chain is lengthened to increase viscosity and deteriorate ion conductivity.

When n is less than 1, the polyether chain linked to the polysiloxane chain may not exist, and compatibility with cyclic carbonates is deteriorated. On the contrary, when n is more than 2, the polyether chain is lengthened to increase viscosity and deteriorate ion conductivity.

When R is either of $CH_3$ or $C_6H_5$, and Z is either of $CH_3$ or $C_2H_5$, the modified polyether silicone oil may be easily synthesized.

The amount of polyether modified silicone oil supported on the positive active material ranges from 0.001 mass % to 10 mass % based on the total amount of the positive active material. According to another embodiment, it ranges from 0.001 mass % to 5 mass %. When the amount of the polyether modified silicone oil is less than 0.001 mass % based on the total amount of the positive active material, the effect on preventing the deterioration of the positive electrode is insufficient. When the amount of the polyether modified silicone oil is more than 10 mass % based on the total amount of the positive active material, the contact between the electrolyte and the positive active material is overly inhibited and the charge and discharge efficiency is deteriorated.

In order to support the polyether modified silicone oil on the active material, any conventional method may be adopted. For example, the positive electrode mass including the active material, the conductive agent, and the binder was coated on the current collector to provide a positive electrode. The positive electrode was dipped in the polyether modified silicone oil to support the polyether modified silicone oil on the positive electrode and dried the same to volatize the solvent. Herein, the positive electrode may be immersed in a solution including a polyether modified silicone oil and a solvent and dried to volatize the solvent.

The solvent may include any one such as a carbonate based solvent (dimethyl carbonate, diethyl carbonate, and so on) or acetone, ethyl alcohol and so on as long as dissolving the polyether modified silicone oil. Herein, the solvent may include the same as in the battery electrolyte solution because the solvent may be remained. The solvent may include a non-volatile solvent having a high boiling temperature due to the convenience to handle.

In order to support the polyether modified silicone oil on the positive active material, the alterative method includes: impregnating the active material with the polyether modified silicone oil; then mixing a positive electrode mass including the active material impregnated with the polyether modified silicone oil, a conductive agent, and a binder with a N-methyl-2-pyrrolidone to provide a positive electrode slurry; coating the positive electrode slurry on a current collector; and drying the same to volatilize the solvent.

Another embodiment of supporting a polyether modified silicone oil on the active material includes: mixing a positive active material mass including an active material, a conductive agent, and a binder with a N-methyl-2-pyrrolidone together with a polyether modified silicone oil to provide a positive electrode slurry; coating the positive electrode slurry on a current collector; and drying the same to volatize the solvent.

The modified polyether silicone oil may be obtained by reacting polyether compounds including double bonds such as $CH_2=CH-$ with polysiloxane where a part of R groups are substituted with hydrogen.

The modified polyether silicone oil may include Pt (platinum) as a catalyst component or butylated hydroxyl toluene (BHT) as a polymerization inhibitor in an amount of several to scores of ppm. Since the Pt or BHT has a bad effect on cycle characteristics, it is preferable to remove these materials. According to one embodiment, the modified polyether silicone oil may include Pt in an amount of less than 5 ppm, or BHT in an amount of less than 60 ppm. It is advantageous that the Pt or BHT is included under a detectable amount.

Negative Electrode

The negative electrode includes a negative active mass including a negative active material, a conductive agent, and a binder; and a negative current collector on which the negative active mass is disposed. The negative active mass may be formed in a disk-shape to fabricate a pellet-shaped or sheet-shaped electrode.

The binder for the negative electrode may be any organic or inorganic material that can be dispersed or dissolved in a solvent along with the negative active material and bind the negative active material after solvent removal. Further, the binder may be a material that can bind the negative active material by mixing the negative active material and then press-forming. The binder may be selected from the group consisting of a vinyl-based resin, a cellulose-based resin, a phenol resin, a thermoplastic resin, a thermosetting resin, and so on. Specifically, the binder may be polyvinylidene fluoride, polyvinyl alcohol, carboxylmethyl cellulose, styrene butadiene rubber, and so on.

The negative electrode may further includes a conductive agent such as carbon black, a graphite powder, a carbon fiber, a metal powder, a metal fiber, and so on, besides the negative active material and binder.

The negative current collector may include a metal foil or a metal net formed of copper.

The negative active material may include carbonaceous materials such as artificial graphite, natural graphite, graphitizable carbon fiber, graphitizable mesocarbon microbeads, amorphous carbon, and so on. For the negative active material, a metal material being capable of alloying with lithium, or a composite material of a metal material and a carbonaceous material may also be used. Non-limiting examples of the metal being capable of alloying with lithium includes Si, Al, Sn, Pb, Zn, Bi, In, Mg, Ga, Cd, Si alloys, Sn alloys, or Al alloys. For the negative active material, a lithium metal foil may also be used.

Non-Aqueous Electrolyte

The non-aqueous electrolyte is an organic electrolyte solution including an aprotic solvent and a lithium salt dissolved therein.

The aprotic solvent includes propylene carbonate, ethylene carbonate, butylene carbonate, benzo nitrile, aceto nitrile, tetrahydrofuran, 2-methyltetrahydrofuran, γ-butyrolactone, dioxolan, 4-methyl dioxolan, N,N-dimethylformamide, dimethyl acetamide, dimethyl sulfoxide, dioxane, 1,2-dimethoxyethane, sulfolane, dichloro ethane, chloro benzene, nitrobenzene, dimethyl carbonate, methylethyl carbonate, diethyl carbonate, methylpropyl carbonate, methylisopropyl carbonate, ethylbutyl carbonate, dipropyl carbonate, diisopropyl carbonate, dibutyl carbonate, diethylene glycol, dimethyl ether, and so on. The aprotic solvent may be in combination. According to one embodiment, the aprotic solvent may essentially includes at least one of propylene carbonate (PC), ethylene carbonate (EC), and butylene carbonate (BC); and at least one of dimethyl carbonate (DMC), methylethyl carbonate (MEC), and diethylcarbonate (DEC).

The lithium salt may be selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$, where x and y are integers, LiCl, LiI, and combinations thereof. According to one embodiment, $LiPF_6$ may be suitable for the lithium salt.

Alternatively, a polymer electrolyte may also be used. The polymer electrolyte includes a polymer such as PEO, PVA, and so on and the above lithium salt, or includes a polymer having a good swelling property in which an organic electrolyte solution is impregnated instead of the aforementioned non-aqueous electrolyte solution.

The rechargeable lithium battery may further include another member besides the positive electrode, negative electrode, and electrolyte. When the non-aqueous electrolyte is a non-gellized electrolyte, a separator interposing between the positive electrode and negative electrode is need. The separator may be a known separator such as a porous polypropylene film, a porous polyethylene film, and so on.

An exemplary embodiment of the present invention will hereinafter be described in detail with reference to the accompanying drawings so that the skilled person in the art can implement the present invention.

FIG. 1 is a schematic cross sectional perspective illustrating a rechargeable lithium battery according to one embodiment of the present invention.

Referring to FIG. 1, the rechargeable lithium battery 1 includes the electrode assembly 14 including the positive electrode 11, the negative electrode 12, and the separator 13 between the positive electrode 11 and the negative electrode 12, and housed in the case 15. The rechargeable lithium battery 1 has a structure where electrolyte is provided through the upper part of the case 15 that is sealed with a cap plate 16 and a gasket 17.

The rechargeable lithium battery may be charged according to the following method.

A charge reaction may generally be performed. When the active material is $LiCoO_2$, lithium ions are deintercalated from $LiCoO_2$ during charging, and then the deintercalated lithium ions are intercalated into a crystal structure of a negative active material, for example graphite. At the end of the charging, $LiCoO_2$ may be $Li_{0.5}CoO_2$ that is an electrochemically instable compound and Co may be easily released.

The positive active material is prevented from contacting an electrolyte and thus is not deteriorated due to a polyether modified silicone oil supported thereon, during charging. Therefore, the rechargeable lithium battery including the positive active material has an excellent cycle characteristic, safety during charging, and stability at overcharge.

The positive active material is improved in terms of electrochemical stability at charging and is not deteriorated due to a polyether modified silicone oil supported thereon Furthermore, the positive active material has an improved cycle-life characteristic due to the electrochemical stability and easy deintercalation of lithium ions therefrom.

The rechargeable lithium battery according to one embodiment of the present invention includes a negative active material including Si as a main component and therefore has high capacity, cycle-life characteristics, and good safety at charging.

The following examples illustrate the present invention in more detail. However, it is understood that the present invention is not limited by these experimental examples.

Example 1

96 parts by mass of $LiCoO_2$ active material was mixed with 10 parts by mass of a polyvinylidene fluoride binder, and 2 parts by mass of a carbon powder (carbon black (Denka Black)) conductive agent and added with N-methyl-2-pyrrolidone to provide a positive electrode slurry. The provided positive electrode slurry was coated on an aluminum foil current collector in accordance with a doctor blade technique. It was dried to volatize N-methyl-2-pyrrolidone, then pressed to provide a sheet electrode.

Further, polyether modified silicone oil represented by the following Formula 6 was added to a dimethyl carbonate (DMC) solvent to provide a 10 mass % of a silicon solution.

The electrode was dipped in the provided silicon solution and dried to volatilize the solvent to provide a positive electrode. Herein, the amount of the polyether modified silicone oil supported on the positive active material was 0.5 mass % based on the total amount of the positive active material.

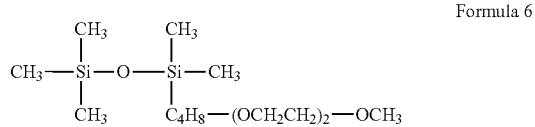

Formula 6

Hereinafter, the method of preparing the negative active material including a multi-phase alloy powder according to one embodiment of the present invention is described.

60 parts by mass of massive Si, 30 parts by mass of Ni powder, and 10 parts by mass of Ag powder were mixed and dissolved by the high frequent heating method to provide an alloy melt solution.

The resultant alloy melt solution was quenched by a gas atomize process with the helium gas to provide a quenched alloy powder having an average diameter of 10 μm.

30 g of the quenched alloy powder was added into 500 ml of 5N hydroxide sodium aqueous solution and slowly agitated at a room temperature to impregnate the same for 1 hour. Then, it was fully washed with a pure water to remove the remained sodium and dried. Subsequently, the particle diameter was arranged to provide a particle having an average particle diameter of 12 μm. Thereby, a negative active material including a multi-phase alloy powder was provided.

The impregnated negative active material was monitored by the scanned electron microscope. The result shows that the negative active material had a porous surface. Further, the IPC analysis was performed for the negative active material. From the result, it was found that the amount of Si was decreased from 60 parts by mass to 50 parts by mass. The EDX (energy dispersive X-ray) was further performed for the negative active material to measure the atomic distribution of the surface thereof. From the result, it was found that Si was present only in the Ni—Si alloy, but a Si single phase was almost disappeared which had been present before the impregnation treatment.

70 parts by mass of the provided negative active material was mixed with 20 parts by mass of graphite powder having an average diameter of 3 μm, 10 parts by mass of a polyvinylidene fluoride binder, and N-methyl-2-pyrrolidone to provide a negative electrode slurry. The resultant negative electrode slurry was coated on a Cu foil current collector having a thickness of 14 μm with a doctor blade. Then, it was dried to volatize N-methyl-2-pyrrolidone, and pressed. Thereby, the negative electrode according to one embodiment of the present invention was provided.

For a non-aqueous electrolyte, $LiPF_6$ was added to a mixed solvent in which was prepared by mixing ethylene carbonate (EC) and diethyl carbonate (DEC) at a ratio of EC:DEC=30:70 to reach the concentration of 1.3 mol/L.

The positive and negative electrodes were cut into discs and the positive electrode and the negative electrode was faced to each other. A polypropylene porous separator was interposed therebetween and input in a battery case. Thereafter, the electrolyte was injected thereto, and the battery case was sealed to provide a coin-type rechargeable lithium cell.

Comparative Example 1

A coin-type rechargeable lithium cell was fabricated in accordance with the same process as in Example 1 except that the positive electrode was not dipped in the polyether modified silicone oil.

The rechargeable lithium cells according to Example 1 and Comparative Example 1 were charged and discharged at 0.2 C until the cell voltage reached to 4.15V, then charged at the constant voltage until the current value reached to 0.01 C. Thereafter, the cells were discharged at 0.2 C until the cell voltage reached to 5.75V. The cells were charged and discharged for 100 cycles at 1 C. The result was shown in Table 1.

Herein, the capacity retention ratio is the ratio of the capacity at the 100 cycles to the capacity at the first cycle.

TABLE 1

| | Capacity retention ratio (%) |
|---|---|
| Example 1 | 84 |
| Comparative Example 1 | 65 |

As shown in Table 1, it is confirmed that the rechargeable lithium battery according to Example 1 had a high capacity retention ratio comparing to that according to Comparative Example 1. That is because the deterioration of the positive active material was prevented during repeating the charge and discharge cycles since a polyether modified silicone oil was supported on the positive active material according to Example 1.

According to the rechargeable battery of one embodiment of the present invention, the deterioration of the positive active material was prevented and the cycle characteristic or the safety on charging the battery were improved by supporting the polyether modified silicone oil including the compound selected from the group consisting of compounds represented by Formulae 1 to 5 and a composite thereof on the positive active material.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A positive active material for a rechargeable lithium battery comprising:
   an active material that can reversibly intercalate and deintercalate lithium; and
   a polyether modified silicone oil supported on the active material,
   wherein the polyether modified silicone oil is selected from the group consisting of the compounds represented by the following Formulas 1 to 5, and combinations thereof:

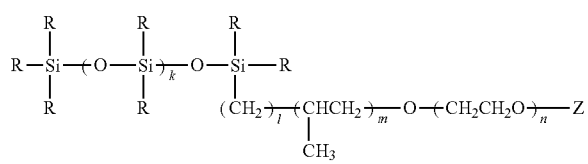
Formula 1

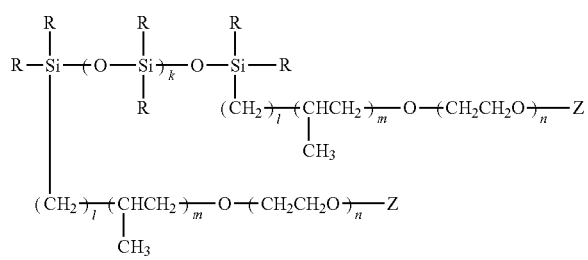
Formula 2

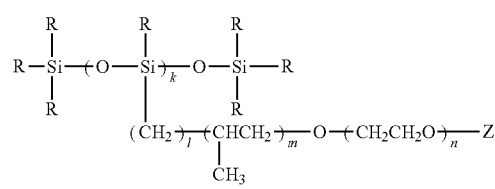
Formula 3

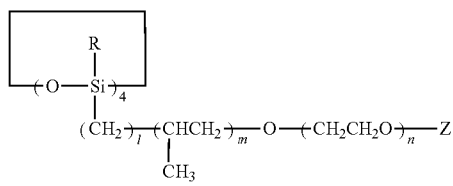
Formula 4

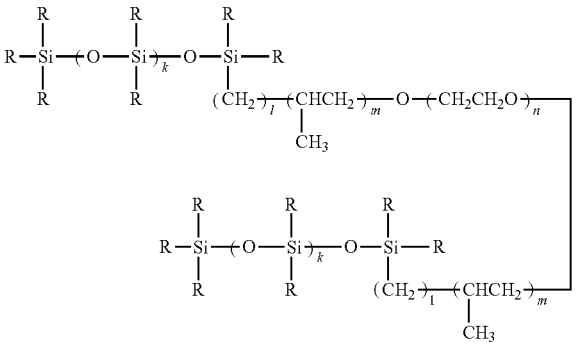
Formula 5 wherein, in the above Formulas 1 to 5, k ranges from 1 to 9, l ranges from 0 to 3, m equals 1, n ranges from 1 to 2, R is either of $CH_3$ or $C_6H_5$, and Z is either of $CH_3$ or $C_2H_5$.

2. The positive active material of claim 1, wherein the polyether modified silicone oil is present in an amount of 0.001 to 10 mass % based on the total mass of the positive active material.

3. The positive active material of claim 2, wherein the polyether modified silicone oil is present in an amount of 0.001 to 5 mass % based on the total mass of the positive active material.

4. The positive active material of claim 1, wherein the polyether modified silicone oil is impregnated in the active material that can reversibly intercalate and deintercalate lithium.

5. A rechargeable lithium battery comprising:
   a positive electrode including a positive active material being capable of reversible intercalation and deintercalation of lithium;
   a negative electrode including a negative active material being capable reversible intercalation and deintercalation of lithium; and
   a non-aqueous electrolyte,
   wherein the positive active material comprises:
   an active material that can reversibly intercalate and deintercalate lithium, and
   a polyether modified silicone oil supported on the active material, and
   the polyether modified silicone oil is selected from the group consisting of the compounds represented by the following Formulas 1 to 5, and combinations thereof:

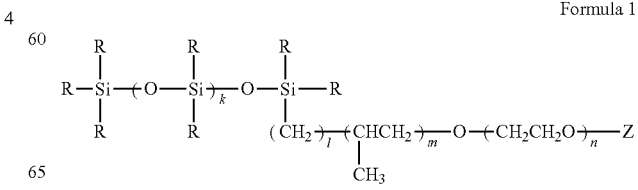
Formula 1

-continued

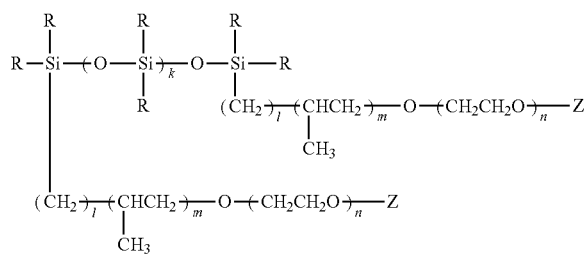

Formula 2

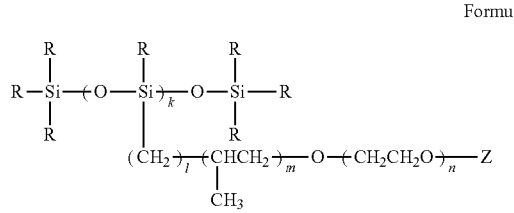

Formula 3

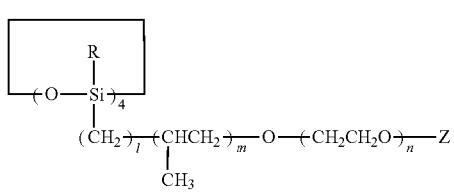

Formula 4

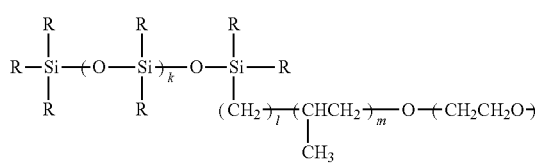

Formula 5 wherein, in the above Formulas 1 to 5, k ranges from 1 to 9, l ranges from 0 to 3, m equals 1, n ranges from 1 to 2, R is either of $CH_3$ or $C_6H_5$, and Z is either of $CH_3$ or $C_2H_5$.

6. The rechargeable lithium battery of claim 5, wherein the negative active material comprises Si as a main component.

7. The rechargeable lithium battery of claim 5, wherein the polyether modified silicone oil is present in an amount of 0.001 to 10 mass % based on the total mass of the positive active material.

8. The rechargeable lithium battery of claim 7, wherein the polyether modified silicone oil is present in an amount of 0.001 to 5 mass % based on the total mass of the positive active material.

9. The rechargeable lithium battery of claim 5, wherein the polyether modified silicone oil is impregnated in the active material that can reversibly intercalate and deintercalate lithium.

10. A method of manufacturing a rechargeable lithium battery comprising:
applying a positive electrode slurry including the positive active material onto a positive current collector to fabricate a positive electrode,
wherein the positive active material comprises an active material that can reversibly intercalate and deintercalate lithium, and
a polyether modified silicone oil supported on the active material,
the polyether modified silicone oil is selected from the group consisting of the compounds represented by the following Formulas 1 to 5, and combinations thereof:

Formula 1

Formula 2

Formula 3

Formula 4

Formula 5 wherein, in the above Formulas 1 to 5, k ranges from 1 to 9, l ranges from 0 to 3, m equals 1, n ranges from 1 to 2, R is either of $CH_3$ or $C_6H_5$, and Z is either of $CH_3$ or $C_2H_5$.

11. The method of manufacturing a rechargeable lithium battery of claim 10, wherein the polyether modified silicone oil is present in an amount of 0.001 to 10 mass % based on the total mass of the positive active material.

12. The method of manufacturing a rechargeable lithium battery of claim 11, wherein the polyether modified silicone oil is present in an amount of 0.001 to 5 mass % based on the total mass of the positive active material.

13. The method of manufacturing a rechargeable lithium battery of claim 10, wherein the polyether modified silicone oil is impregnated in the active material that can reversibly intercalate and deintercalate lithium.

14. A method of manufacturing a rechargeable lithium battery comprising:
applying a positive electrode slurry including a positive active material being capable reversible intercalation and deintercalation of lithium onto a positive current collector to fabricate an positive electrode, and
dipping the positive electrode in a solution including the polyether modified silicone oil selected from the group consisting of compounds represented by the following Formulas 1 to 5, and combinations thereof, or applying positive electrode with a solution including the polyether modified silicone oil selected from the group consisting of compounds represented by the following Formulas 1 to 5:

Formula 1

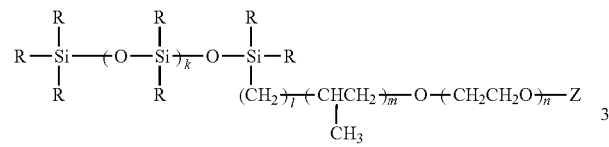

Formula 2

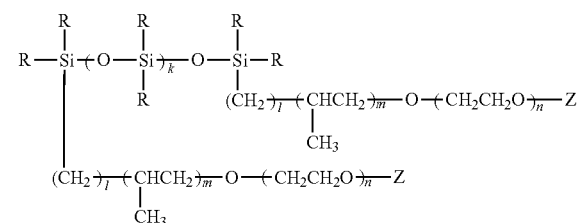

Formula 3

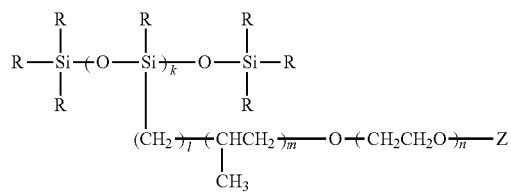

Formula 4

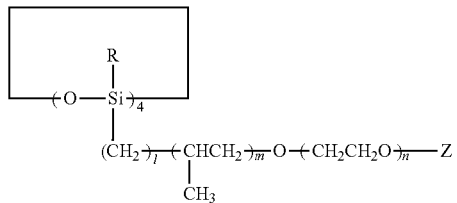

Formula 5

15. The method of manufacturing a rechargeable lithium battery of claim 14, wherein the polyether modified silicone oil is impregnated in the active material that can reversibly intercalate and deintercalate lithium.

16. The method of manufacturing a rechargeable lithium battery of claim 15, wherein the polyether modified silicone oil is present in an amount of 0.001 to 10 mass % based on the total mass of the positive active material.

17. The method of manufacturing a rechargeable lithium battery of claim 16, wherein the polyether modified silicone oil is present in an amount of 0.001 to 5 mass % based on the total mass of the positive active material.

* * * * *